(12) United States Patent
Mu et al.

(10) Patent No.: US 7,934,066 B2
(45) Date of Patent: Apr. 26, 2011

(54) EXTENSIBLE APPLICATION BACKUP SYSTEM AND METHOD

(75) Inventors: Yuedong Paul Mu, Sunnyvale, CA (US); Sajeev Aravindan, Sunnyvale, CA (US)

(73) Assignee: NetApp, Inc., Sunnyvale, CA (US)

(*) Notice: Subject to any disclaimer, the term of this patent is extended or adjusted under 35 U.S.C. 154(b) by 461 days.

(21) Appl. No.: 12/113,012

(22) Filed: Apr. 30, 2008

(65) Prior Publication Data

US 2009/0276591 A1 Nov. 5, 2009

(51) Int. Cl.
*G06F 12/00* (2006.01)
(52) U.S. Cl. .................. 711/162; 711/E12.001
(58) Field of Classification Search .......... 711/161, 711/162, 165, 170, E12.001; 714/6; 709/203
See application file for complete search history.

(56) References Cited

U.S. PATENT DOCUMENTS

| | | | |
|---|---|---|---|
| 6,721,766 B1 * | 4/2004 | Gill et al. | 711/161 |
| 7,546,323 B1 * | 6/2009 | Timmins et al. | 711/162 |
| 7,558,840 B1 * | 7/2009 | Howard et al. | 709/203 |
| 2002/0059505 A1 * | 5/2002 | St. Pierre et al. | 711/162 |
| 2003/0028592 A1 * | 2/2003 | Ooho et al. | 709/203 |
| 2005/0108486 A1 * | 5/2005 | Sandorfi | 711/162 |
| 2005/0216788 A1 * | 9/2005 | Mani-Meitav et al. | 714/6 |

* cited by examiner

*Primary Examiner* — Pierre-Michel Bataille
(74) *Attorney, Agent, or Firm* — Wiesner & Associates; Leland Wiesner

(57) ABSTRACT

An archive method and system receives a backup request for a target dataset used by an application on a primary storage system to be backed up on a secondary storage system. Different applications may each have a corresponding proprietary application format for storing their datasets. An application translator module is loaded into an extensible backup manager that converts between a proprietary application format associated with the target dataset and a predetermined storage format used by the extensible backup manager. The application translator module converts from the proprietary application format into the predetermined storage format when the baseline backup of the target dataset has not yet been performed. An incremental backup uses the application translator module to convert from the proprietary application format associated with the application into the predetermined storage format of the extensible backup manager. Once completed, a data mover component causes the incremental backup and the baseline backup of the entire target dataset, if scheduled, to be moved from the primary storage to the secondary storage and stored in the predetermined storage format rather than the proprietary application format associated with the application.

18 Claims, 6 Drawing Sheets

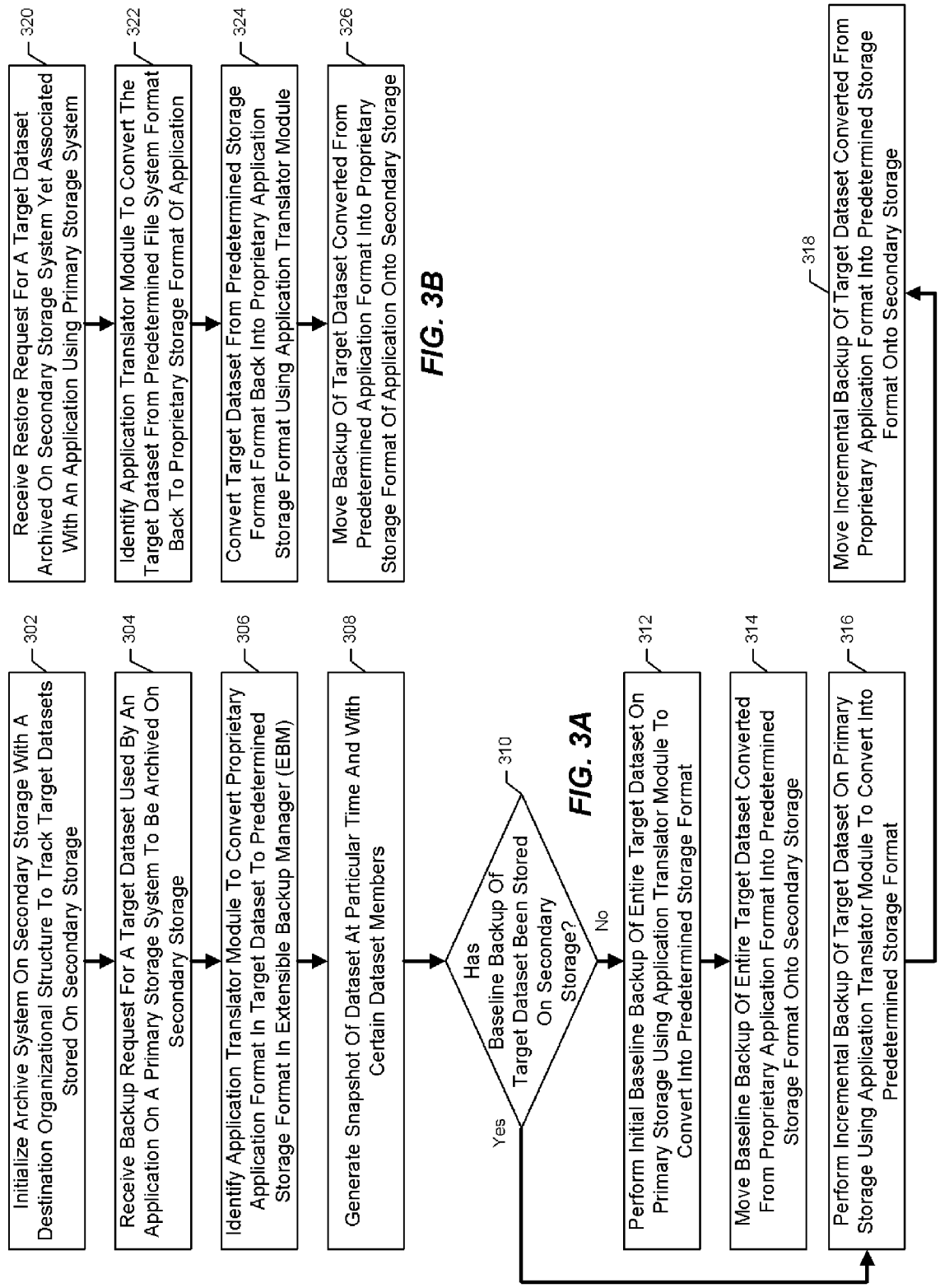

EXTENSIBLE APPLICATION BACKUP SYSTEM AND METHOD

CROSS-REFERENCE TO RELATED APPLICATIONS

This application also relates to the subject matter disclosed in the co-pending U.S. application Ser. No. 12/111,756, by Paul Yuedong Mu, Sajeev Aravindan and Chandrasekar Srinivasan, titled "METHOD AND APPARATUS FOR EFFICIENTLY DETECTING FILE SYSTEM CHANGES", incorporated by reference herein.

BACKGROUND

In many computer installations, a secondary storage system maintains backups of datasets as they are modified or changed on a primary storage system. These secondary storage systems generally use hard-drives or other random access storage to keep the backed up datasets accessible and readily available. Tape and other sequentially accessed storage may also be used as part of the secondary storage system to maintain compatibility with existing tape backups and systems. These tape systems suffer from slower access times but are often included in a backup strategy for legacy and compatibility reasons.

Secondary storage systems from Network Appliance of Santa Clara Calif. provide disk-to-disk (DTD) type backups using their NearStore® products in conjunction with other solutions. In particular, the NearStore® products provide a storage solution for businesses that want to simplify and also automate their backups and restores using higher speed storage offered in the disk-to-disk technologies. High speed hard-drives used in the NearStore solutions allow reliable DTD backups to be made despite increasingly larger storage requirements and smaller time frames to complete. The secondary storage based on disk technologies is not only faster and more efficient but also more reliable as the backups can be verified and checked almost immediately or even in a real-time manner.

To accommodate enterprises using tape storage, Network Appliance further provides a NearStore® Virtual Tape Library (VTL) that operates and appears like a tape library system to a backup software application but provides superior speed and reliability of disk technologies. By emulating a variety of tape library solutions, large enterprise information technology (IT) departments can transition from slower and less reliable tape backup solutions to faster and more reliable DTD technologies. Secondary storage using VTL solutions allows insertion of the more desirable DTD solutions into enterprises implementing an array of heterogeneous tape library backup solutions and operating environments.

Backup strategies are also designed to increase the efficiency of performing backup and restore functions. A full backup of a filesystem or volume made at certain time intervals followed by incremental backups that take place between the full backups. Full backups are performed more infrequently than the incremental backup as they generally take a longer period of time to complete. The full backup typically copies all files in the filesystem or data in a data volume to the secondary storage thus creating a baseline for subsequent incremental backups. Snapshot-type backups are capable of flushing buffers and cache storage in the operating system, filesystem or application to ensure the data made during the full backup is as complete and up-to-date as possible.

Components performing incremental backups monitor the data changes in these filesystems and volumes and only backup the data changed after the full backup. In some cases, the incremental backups occurring at the filesystem level may copy complete files that have been modified after a full backup. More efficient incremental backup solutions only backup those blocks of data in a filesystem or volume modified after the full backup. In enterprises with large amounts of storage, the incremental backup operating at the block level can save a great deal of time as only a fraction of the data consisting of the changed blocks in the filesystem or volume need be moved from the primary storage to the secondary storage systems.

Unfortunately, the wide range of application servers and operating environments found in these enterprises do not store or use data in a uniform manner. For example, multiple application servers may all store application data locally on a primary storage system using multiple different proprietary data formats. Identifying changed blocks of data for incremental backups cannot be performed unless an application has a detailed understanding of each of these proprietary data formats. Operating environments used in the enterprise may also complicate matters and often include Unix, Linux, Apple OS and Windows. Applications may store data in these operating environments using filesystems, blocks, streaming data, through database applications and many other combinations therefore.

Indeed, some application servers may also include custom programmed backup clients to run on the application server and backup the data from the primary storage system to the secondary storage system. These backup clients, also referred to as software agents or "plug-ins", must not only store but also retrieve the proprietary datasets from secondary storage on demand. For example, the conventional "plug-in" may be responsible for obtaining changed blocks from a dataset used by an application during a backup and moving the data to the secondary server. During a restore function, the "plug-in" obtains the data stored in the proprietary format from the secondary storage and ensures it is properly restored to primary storage in a format appropriate to the application.

These custom programmed backup clients may process the corresponding proprietary datasets but their monolithic design does not scale well in a complex enterprise environment. First, it takes a great deal of time to develop "plug-ins" for new applications as the "plug-ins" each must be capable of performing reliable backup and restore functionalities. This requires custom coding and extensive quality-assurance. Further, running multiple "plug-ins" may lead to contention for the same system resources and possible deadlock as individual backup clients may have overlapping functional requirements and cannot coordinate an efficient use of the system resources. For example, normal fluctuations in system resources, network bandwidth, available memory and processing power can introduce race conditions during a backup or restoration causing the agent or "plug-in" performing a backup or restore to fail. This in turn often requires restarting the backup or restore procedures as the dataset in the underlying application may have changed or been corrupted.

Increasing the reliability and scalability of data archiving provides a crucial edge to companies providing secondary storage systems. IT departments require that new secondary storage systems easily integrate within their heterogeneous operating and application environments with minimal development and integration risks. Development of customized software should also be possible with low or no costs and/or licensing requirements. To accommodate fast growing demand for secondary storage systems, the backup solutions should also be scalable and use resources efficiently. For example, the backup operations themselves should not be the cause of a server becoming overloaded or going down even during a peak-period of archiving data.

BRIEF DESCRIPTION OF THE DRAWINGS

The features of the present invention and the manner of attaining them, and the invention itself, will be best understood by reference to the following detailed description of embodiments of the invention, taken in conjunction with the accompanying drawings, wherein:

FIG. 3A and FIG. 3B are flowchart diagrams illustrating the operations for performing the archiving of data stored on primary storage to a secondary storage in accordance with one or more aspects of the present invention;

SUMMARY OF THE INVENTION

Figure 1:
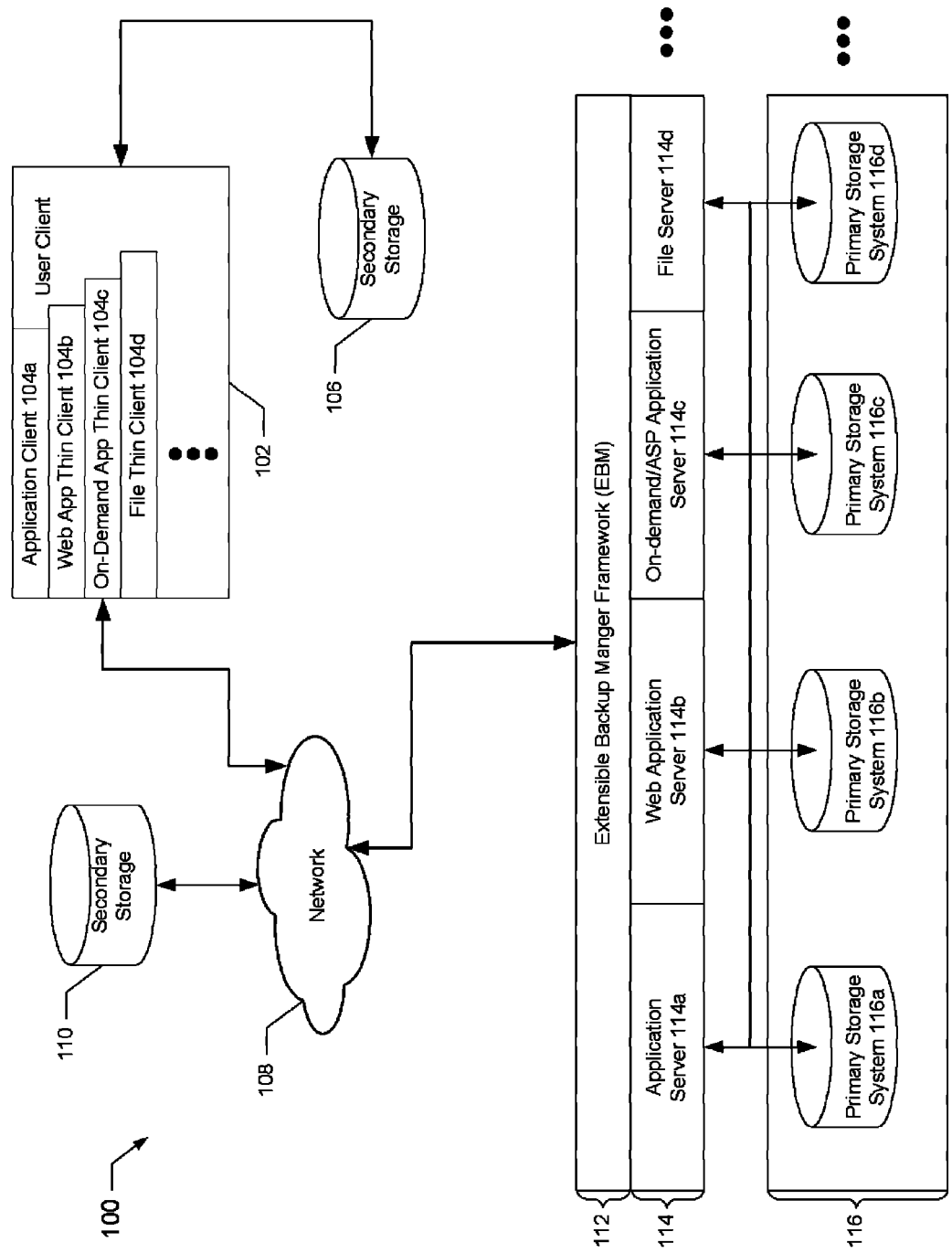
FIG. 1 is a schematic diagram of an exemplary system 100 illustrating a scalable secondary storage and backup framework using application translator modules within an extensible backup manager (EBM) according to aspects of the present invention.

Aspects of the present invention include an archive method using a primary storage and a secondary storage comprising. The archive method receives a backup request for a target dataset used by an application on a primary storage system to be backed up on a secondary storage system. The primary storage system may have one or more different applications and each application having a corresponding one or more different proprietary application formats for storing their datasets. The archive method and system identifies an application translator module component to be loaded into an extensible backup manager that converts between a proprietary application format associated with the target dataset and a predetermined storage format used by the extensible backup manager. In addition, the archive method may schedule a baseline backup of entire target dataset from the primary storage to the secondary storage also using the application translator module to convert from the proprietary application format into the predetermined storage format when the baseline backup of the target dataset has not yet been performed. Depending on what has been requested, the archive method and system performs an incremental backup of the target dataset in addition to the baseline backup of the entire target dataset. The incremental backup uses the application translator module to convert from the proprietary application format associated with the application into the predetermined storage format of the extensible backup manager. Once the conversion has completed, a data mover component from the extensible backup manager causes the incremental backup and the baseline backup of the entire target dataset, if scheduled, to be moved from the primary storage to the secondary storage as requested and stored in the predetermined storage format rather than the proprietary application format associated with the application.

Alternatively, an archive method using a primary storage and a secondary storage may be used to restore a target dataset. The archive method generally receives a restore request for a target dataset archived on a secondary storage system yet associated with an application on a primary storage system. It should be appreciated that the primary storage system may have one or more different applications and each application having a corresponding one or more different proprietary application formats for storing their datasets.

Typically, the archive method identifies an application translator module to be loaded into an extensible backup manager that converts between a predetermined storage format used by the extensible backup manager and a proprietary application format associated with the target dataset. Next the archive method converts the target dataset archived in a predetermined storage format back into the proprietary application storage format. In some cases, the archive method invokes a data mover component from the extensible backup manager when the application translator module has completed converting from the predetermined storage format into the proprietary application format. The data mover component causes the incremental backup and the baseline backup of the entire target dataset, if the baseline backup is requested, to be moved from the secondary storage to the primary storage. The resulting dataset is to be stored on the primary storage in the proprietary application format associated with the application instead of the predetermined storage format associated with the extensible backup manager.

DETAILED DESCRIPTION

Benefits provided by aspects of the present invention include, but are not limited to, at least one or more of the following mentioned herein below. One benefit of the present invention provides a method and system for integrating secondary storage systems to backup or restore data from a heterogeneous collection of applications. Applications running on servers generally store and retrieve datasets from a primary storage system but archive the datasets in accordance with aspects of the present invention on a secondary storage. To achieve the desired scalability and reliability, the archival events are coordinated using a central extensible backup manager (EBM) and a variety of lightweight application translator modules compatible with each application. The central extensible backup manager (EBM) can be used to more closely monitor and track backup or restore operations for many different applications but also provide feedback on the status of these operations as well.

Aspects of the present invention have reduced requirements for system resources, network bandwidth, memory and processing power. Using the central extensible backup manager (EBM) in the backup framework dramatically reduces the resource footprint typically associated with performing a large number of archive events. This extensible backup manager (EBM) selects the appropriate application translator module for a particular application and then ensures that a particular backup or restore of the application is completed. Implementations of the present invention allow for multiple archive events to be started in the backup framework of the present invention without demanding a direct and corresponding increase in the demand for bandwidth, memory and processing.

To avoid a sudden demand in resources, the EBM may coordinate multiple application translator modules performing backups in parallel yet may selectively serialize or queue certain other operations that do not have to be performed in parallel. For example, the EBM may queue and perform post-processing verification of an application dataset once each application translator module has successfully backed up an application on a local primary storage. Queuing certain events allows the EBM to also smooth out the sudden demand for memory and other resources and reduce the probability of deadlocks or processing bottlenecks. This increases the overall reliability of the backup and restore as well as post-processing verifications and other operations.

It is contemplated that aspects of the present invention would also allow for rapid integration of secondary storage in backing up applications. Rather than using large monolithic agents or applications, the EBM would only require the creation of a lightweight application translator module. The development effort to create the application translator module would be limited to isolating a particular dataset within an application and then extracting the dataset either directly from a storage area used by the application or through one or more interfaces provided by the application. Quality assurance requirements for these coding efforts would also be minimized as the overall code-base required to develop each integrate each additional application into the framework is reduced.

Aspects of the present invention also improve scalability and extend the life-cycle of both software systems and secondary storage. Increased numbers of applications can be backed up to secondary storage without significant overhead for processing and resources. The smaller memory and resource footprint required by each different application translator module allows more backups to occur in parallel while also allowing for more efficient processing. Even if there is a sudden increase in archive requests, the EBM prioritizes the resources allocated to prevent a corresponding sudden increase of the resources on a server. In effect, the EBM and other aspects of the present invention allow a large volume of archive events to be submitted without overbooking resources and putting system operation at risk. For example, application translator modules associated with each of the application are less likely to fail and/or require backups to be restarted. This saves time required to complete the archive requests and also results in more efficient overall operations.

FIG. 1 is a schematic diagram of an exemplary system 100 illustrating a scalable secondary storage and backup framework using application translator modules within an extensible backup manager (EBM). In this example configuration of the framework, a user client 102 in FIG. 1 includes a variety of possible user applications including thin client 104a, web application thin client 104b, on-demand thin client 104c and file thin client 104d with a locally attached secondary storage 106. Another secondary storage 110 accessible over network 108 may also be used in lieu of or in combination with secondary storage 106. For example, secondary storage 110 and secondary storage 106 may be implemented using either be network attached storage (NAS), storage area networks (SAN) or various combinations thereof. Both secondary storage 110 and secondary storage 106 can be used to archive datasets from applications and servers 114 storing data on a primary storage 116 in FIG. 1. The applications may be enterprise applications integrated with aspects of the present invention for performing backup operations in conjunction with secondary storage. For example, a CRM (customer relationship management) application may install web application thin client 104b on a user client 102 that accesses a web application server 114b to deliver a CRM-type application. The web application thin client 104b may have an option to perform a backup of the user's datasets for the CRM application using either secondary storage 106 attached locally or secondary storage 110 available remotely as illustrated.

System 100 further includes an extensible backup manager (EBM) 112 capable of servicing backup requirements for multiple different applications and servers 114 on a heterogeneous set of operating platforms. Various applications and servers 114 may include an application server 114a, a web application server 114b, an on-demand/application service provider (ASP) application server 114c and a file server 114d. The servers and EBM 112 are compatible with multiple different operating systems including Solaris, HP-U, AIX, Windows, IRIX, Linux and others and generally store data on one of primary storage systems 116. In one implementation, each of the aforementioned respective servers may have a separate primary storage illustrated respectively as primary storage system 116a, primary storage system 116b, primary storage system 116c and primary storage system 116d.

While a single EBM 112 is illustrated, it is contemplated that multiple instances of EBM 112 may reside on or be associated with each primary storage system 116a-d for each of the different applications and servers 114. However, it is also possible that only one instance of EBM 112 may be loaded on only one of the primary storage systems 116 and one of the applications and servers 114. For example, this would be possible if a single operating system is implemented across an enterprise and the connectivity and communication bandwidth among the various application servers is adequate.

Secondary storage backups have increased scalability and reliability thus making it possible to deliver backup services to consumers and a larger number of enterprises at a lower overall cost. In one implementation of the present invention, a user may run one or more various client applications identified as application client 104a, web application thin client 104b, on-demand applications thin client 104c and filesystem thin client 104d. The application client 104a represents a traditional application loaded on user client 102 that resides almost exclusively on a local storage device (not illustrated) attached to user client 102. Web application thin client 104b includes applications that exist within a browser environment and installed as extensions or add-ons to a browser's base functionality. The web application thin client 104b generally includes a class of applications downloaded through a browser or website but invoked through a separate windowing and interactive environment on a user client. Likewise, on-demand application thin client 104c includes applications that are also downloaded automatically from a website or web page but has charges assessed for each use or for a time interval the on-demand application thin client 104c is used.

File server thin client 104d is a thin client installed on user client 102 that allows someone to browse a set of files stored on one or more of primary storage systems 116. The file server thin client 104d also may include an archive option to archive various files on a certain secondary storage archives and at a particular frequency and type. For example, file server thin client 104d may specify that the files associated with file server 114d are backed up daily at 3:00 a.m. from one of primary storage systems 116 onto secondary storage 110. While these aforementioned types of thin clients are typical, it is contemplated that aspects of the present invention could apply to the backup services associated with a wide range of applications, web-sites as well as more traditional fileserver functionality.

It is also contemplated that the various aforementioned client applications may be developed using a wide range of software development tools and environments including, JavaScript, Java, C, AJAX (Asynchronous JavaScript and XML), LAMP (Linux, Apache, MySql, PHP|Perl|Python) and other suitable tools or suites of tools. It is also contemplated that a wide range of backup applications and general applications may be developed and made available on user client 102. For example, backup applications designed specifically to backup data may include any number of features used to schedule timing, identify storage locations, backup types (i.e., snapshot, incremental, full, specific files) and other parameters associated with making backups to a secondary storage such as secondary storage 106 and secondary storage 110.

General applications on user client 102 range from basic user applications up to an enterprise application having an integration point to also perform backup operations in conjunction with secondary storage. For example, a point-of-sale application or an airline reservation client may be one example of application client 104a that may run on a local computer but need to access one or more applications and servers 114 and datasets remotely located on one of primary storage systems 116.

A CRM application from a company like Salesforce.com is an example of another general application that would benefit from aspects of the present invention. The CRM application installation may also install a web application thin client 104b on a user client 102. This web application thin client 104b accesses a web application server 114b and coordinates backup and restore of the datasets on secondary storage 106 or 110 and primary storage systems 116 respectively. It is also contemplated that web application thin client 104b may also include, for example, asset management software tools, stock trading software and other types of applications installed as extensions into a browser to provide a new functionality. The web application thin client 104b may also include a variety of social-networking websites or other user oriented programs. For example, it is contemplated that web application thin client 104b may include websites like MySpace, Facebook, Friendster, LinkedIn and other social/business communication websites.

Each of the aforementioned application types as well as other application types may further have an option to backup either the enterprise or user's datasets for the particular application using either secondary storage 106 attached locally or secondary storage 110 available remotely as illustrated. Application on user client 102 may incorporate an option to specify a secondary storage and specific backup criteria for archiving the specific instance of the application for the user or enterprise. For example, user client 102 illustrated in FIG. 1 may have an archive option in on-demand application thin client 104c to specify that secondary storage 110 is to be used for archival backup purposes. It also may also include frequency options for performing backups of the dataset used by user client 102 either daily, weekly or at other frequencies deemed useful for the particular application. This fine-grained ability to control the backup of individual datasets from a much larger storage associated with applications and servers 114 has many benefits as will be described later herein.

Figure 2A:
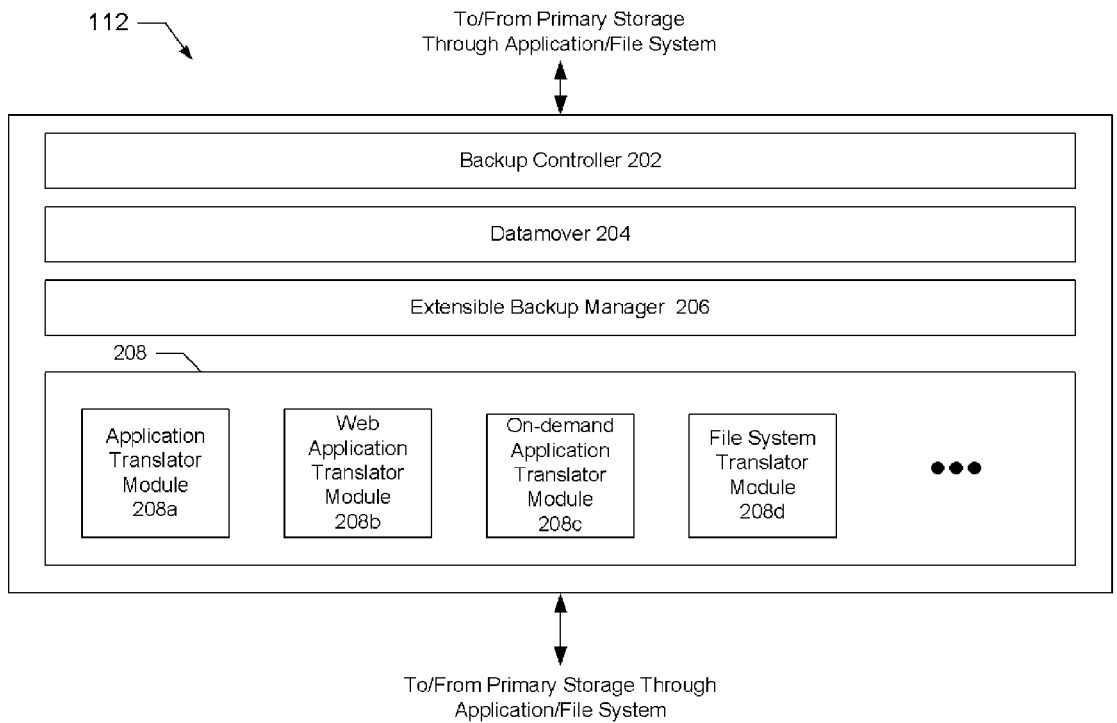
FIG. 2A is a block diagram illustrating overall architecture of an Extensible Backup Manager (EBM) Framework and related components in accordance with one implementation of the present invention.

Referring to FIG. 2A, a block diagram illustrates an overall architecture of an Extensible Backup Manager (EBM) Framework 112 and related components. In particular, the architecture or design of EBM Framework 112 includes a backup controller 202, a datamover 204, an extensible backup manager 206 and a set of application translator modules 208.

The backup controller 202 operates to interface with one or more applications on user client 102 performing preliminary processing functions including parsing command requests, identifying availability of certain compression and other features, security and encryption as well as other necessary precursors to performing a backup on secondary storage.

Datamover 204 is a component responsible for securely and reliably transferring baseline backups of an entire dataset or incremental backups of the dataset from a primary storage to a secondary storage. The datamover 204 generally receives an address or location of an application dataset that has been snapshotted and converted to a storage format. Datamover 204 may perform various checksum operations or verifications on the backed up dataset locally on primary storage as well as remotely on secondary storage to ensure the data is not corrupted in transit. It may also be the responsibility of datamover 204 to invoke sufficient levels of encryption and security to ensure that sensitive information in a backed up dataset is not compromised and otherwise made available during this process.

Extensible backup manager 206 is a component responsible for making sure the actual datasets are backed up properly and in the right format. As each request arrives, extensible backup manager 206 identifies the type of dataset being backed up and determines which of the application translator modules 208 should be used to backup the dataset. For example, extensible backup manager 206 may select application translator module 208a to backup an accounting application because the application translator module 208a interfaces with an application programming interface (API) of the specific accounting application or can extract data directly from a database or datafile used by the accounting application. Extensible backup manager 206 may spawn or invoke multiple application translator modules for many different backup requests in order to process the requests in a parallel manner. Optionally, extensible backup manager 206 may also be responsible for monitoring the execution of each of the application translator modules and restart them as appropriate. It may also be the role of extensible backup manager 206 to remove any failed backup attempts, if at all, and restart the application translator modules to perform further backups as needed.

Application translator modules 208 are typically loaded into the extensible backup manager 206 in order to convert between a proprietary application format associated with a target dataset and the predetermined storage format used by the extensible backup manager 206. Each of the application translator modules 208 are only loaded into memory as needed thus reducing the overall memory footprint required to perform a dataset backup. The application translator modules 208 are also smaller in size since they perform only the limited functions of extracting the dataset from an application and then converting it into a predetermined storage format.

By limiting their size and function, the application translator modules 208 can be developed more rapidly and also tend to execute more reliably. For example, application translator modules 208 include application translator module 208a, web application translator module 208b, on-demand application translator module 208c and even a file system translator module 208d. Each of these modules corresponds to specific corresponding applications provided by servers like application server 114a, web application server 114b, on-demand/ASP application server 114c or file server 114d. The respective module may be developed and provided by the application developer but needs only obtain the target dataset as requested and then convert the resulting proprietary application format into a predetermined storage format for the extensible backup manager 206. Once the module has been developed, the application may be backed up in accordance with the present invention using EBM framework 112 and secondary storage located either locally or remotely over a network.

Figure 2B:
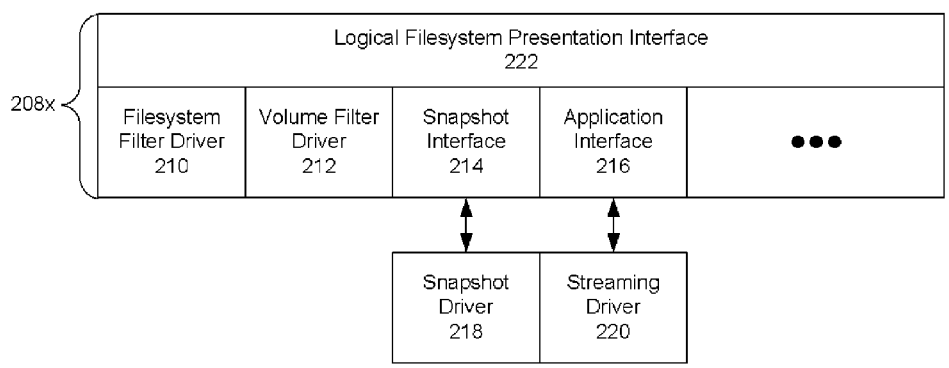
FIG. 2B is a schematic diagram of the subcomponents making up an application translator module designed in accordance with aspects of the present invention and in accordance with one implementation of the present invention.

FIG. 2B is a schematic diagram of the subcomponents making up an application translator module 208x designed in accordance with aspects of the present invention. The application translator module 208x can be any one of the application translator modules 208 as illustrated. In this example, application translator module 208x includes a filesystem filter driver 210, volume filter driver 212, snapshot interface 214, application interface 216, snapshot driver 218 and streaming driver 220. In some cases, application translator module 208x may have just one driver/interface or multiple.

For example, filesystem filter driver 210 may be used to monitor changes in a group of files or to an entire filesystem. This assists making incremental backups of files or application. The filesystem filter driver 210 is integrated with an application through an API or by directly accessing a database or datafile used by the application. Blocks of data modified by the application are compared with previous baseline backups based on time or other criteria and then passed to logical filesystem presentation interface 222. Likewise, volume filter driver 212 monitors changes made to an overall volume of data and helps backup data from applications writing directly to the physical volume rather than files in filesystem.

Snapshot interface 214 allows the module to cut a snapshot of a filesystem or volume (i.e., block level data) with consistent data throughout an application at a specified point in time. This application consistent snapshot can be subsequently used for both baseline and incremental backups. It is contemplated that module 208x uses snapshot interface 214 to interact with a snapshot driver 218 specific to an application, a filesystem or a volume, as appropriate under the circumstances, to cut the snapshot. Module 208x directs the driver to quiesce an application, flush cache and other functions to obtain the snapshot. For example, a baseline backup request for an entire filesystem first creates an application consistent snapshot of the target dataset through the snapshot interface 214 and using snapshot driver 218.

Alternatively, if the application cannot be snapshotted then application interface 216 may receive incremental changes from an application through streaming data provided by streaming driver 220. For example, the application may be a video application that produces stream data and not blocks of data suitable for snapshots. If the application produces streaming data and not data blocks then metadata associated with the streaming data is packaged and it is converted into a block format before being sent to the logical filesystem presentation interface 222. Next, it is the responsibility of the logical filesystem presentation interface 222 to convert the block representation of the data from the proprietary application format of the target dataset into the predetermined storage format of the extensible backup manager 206.

FIG. 3A and FIG. 3B are flowchart diagrams illustrating the operations for performing the archiving of data stored on primary storage to a secondary storage in accordance with one aspect of the present invention. In particular, FIG. 3A represents operations associated with a secondary storage backup and FIG. 3B represents operations associated with a secondary storage restore of data. These flowcharts specify having a separate backup archive event from the restore event yet it is necessary for both of these operations to be used together. For example, it is necessary for the backup and restore operations to work together and convert between the predetermined storage format of the extensible backup manager 206 and the proprietary format of each particular application.

In the example backup operations in FIG. 3A, an archive system on secondary storage is initialized with a destination organizational structure to track target datasets stored on secondary storage (302) For example, a qtree is one organizational data structure used by Network Appliance in their filers for organizing data in a hierarchical and flexible format.

Next, implementations of the present invention receive a backup request for a target dataset being used by an application (304). Generally, the request specifies which dataset on a primary storage system is to be archived and the backup destination on a particular secondary storage. For example, the request may specify backing up an application dataset on a locally attached secondary storage attached using fibre channel or other high speed interconnect. Alternatively, the request may specify using secondary storage not attached locally but located remotely over a network or the Internet. Of course, the request may also specify the backup to include the use of compression, encryption, a time frame for completing the backup request and other backup related parameters.

Once the request is accepted, the extensible backup manager (EBM) identifies an appropriate application translator module for extracting the application data from the application (306). After extracting the application data from the application, the selected application translator module converts from the proprietary application format of the target dataset to a predetermined storage format suitable to be processed further by the extensible backup manager (EBM). As previously described, the EBM may invoke or spawn additional application translator modules for each backup request to improve performance when performing the backup and conversion operations between a proprietary format and the predetermined format used by the EBM.

A snapshot backup is generated for the dataset at a particular time and with certain dataset members as preparation for subsequent backup events (308). For example, a snapshot backup records the state of a filesystem, volume or other dataset and flushes data from cache, temporary storage and the application. Preferably, the application is put into a quiesced state of operation to limit the amount of application activity and operations on the data. In most cases, the snapshot and state of the dataset is a prerequisite to performing a reliable subsequent backup of the application.

Aspects of the present invention then determine whether a baseline backup of the target dataset has already been made and stored on the designated secondary storage (310). For example, it may be necessary to make a complete backup of the target dataset before delta or incremental backups can feasibly be made. In response to the determination, it may be appropriate for one implementation of the present invention to perform an initial baseline backup of entire target dataset on primary storage and conversion into a predetermined storage format using the application translator module. (312). Once converted from proprietary application format into predetermined storage format, a data mover component may be instructed to then move the baseline backup of entire target dataset onto secondary storage (314). For example, the data mover component may transfer data from the target dataset on primary storage to a predetermined location on secondary storage as requested using encryption, compression, secure socket layer (SSL) and any other supported option as requested.

Alternatively, aspects of the present invention may instead perform an incremental backup of target dataset on primary storage also using the application translator module to convert from a proprietary format to a predetermined storage format (316). Since a complete backup of the dataset was made previously it may be possible that only a delta or incremental backup is necessary. For example, a volume filter driver may only identify certain blocks that have been recently modified to include in the backup. Once again, the selected application translator module is responsible for converting between a proprietary format used by the particular application and then convert it into a predetermined storage format as used by the EBM. Once the delta, incremental or snapshot-type backup has been completed then a datamover is employed to move the dataset from the primary storage to the designated location on secondary storage (318).

Referring to FIG. 3B, the data restore operations are performed using a parallel set of operations and components. Initially, aspects of the present invention receive a restore request for a target dataset previously archived on a secondary storage system. (320) Typically, the target dataset is associated with an application storing data using the primary storage system but for some reason the data has been lost or destroyed.

In one implementation, the EBM of the present invention can be used to then identify an application translator module to convert the target dataset from predetermined file system format back to proprietary storage format of application (322). For example, a video or audio application available in a streaming data format may have been archived on a secondary storage using blocks embedded with metadata and formatted according to the predetermined file system format associated with the EBM. During the restore operations, the EBM may reference the metadata stored along with the data to identify the details of the format used to archive the streaming data into the various blocks stored by the EBM on the secondary storage. The metadata also may suggest or require a particular application translator module to ensure the re-conversion back to the application format is done properly and efficiently.

Implementations of the present invention provide archiving of datasets from a heterogeneous set of applications and operating environments using a central collection point referred to as the extensible backup manager (EBM). This not only makes the archive process more efficient and reliable but greatly simplifies storage as all the archived data is stored in a predetermined storage format and not according to the various proprietary data formats used by each individual application. For example, this greatly simplifies disaster recovery as the EBM extracts data directly from the secondary storage and the appropriate application translator module can then convert the data back into the proprietary application format. Accordingly, this arrangement allows the proprietary data of an application to be restored without relying on the presence of the specific application or the version of the application that originally created the data.

Figure 4:
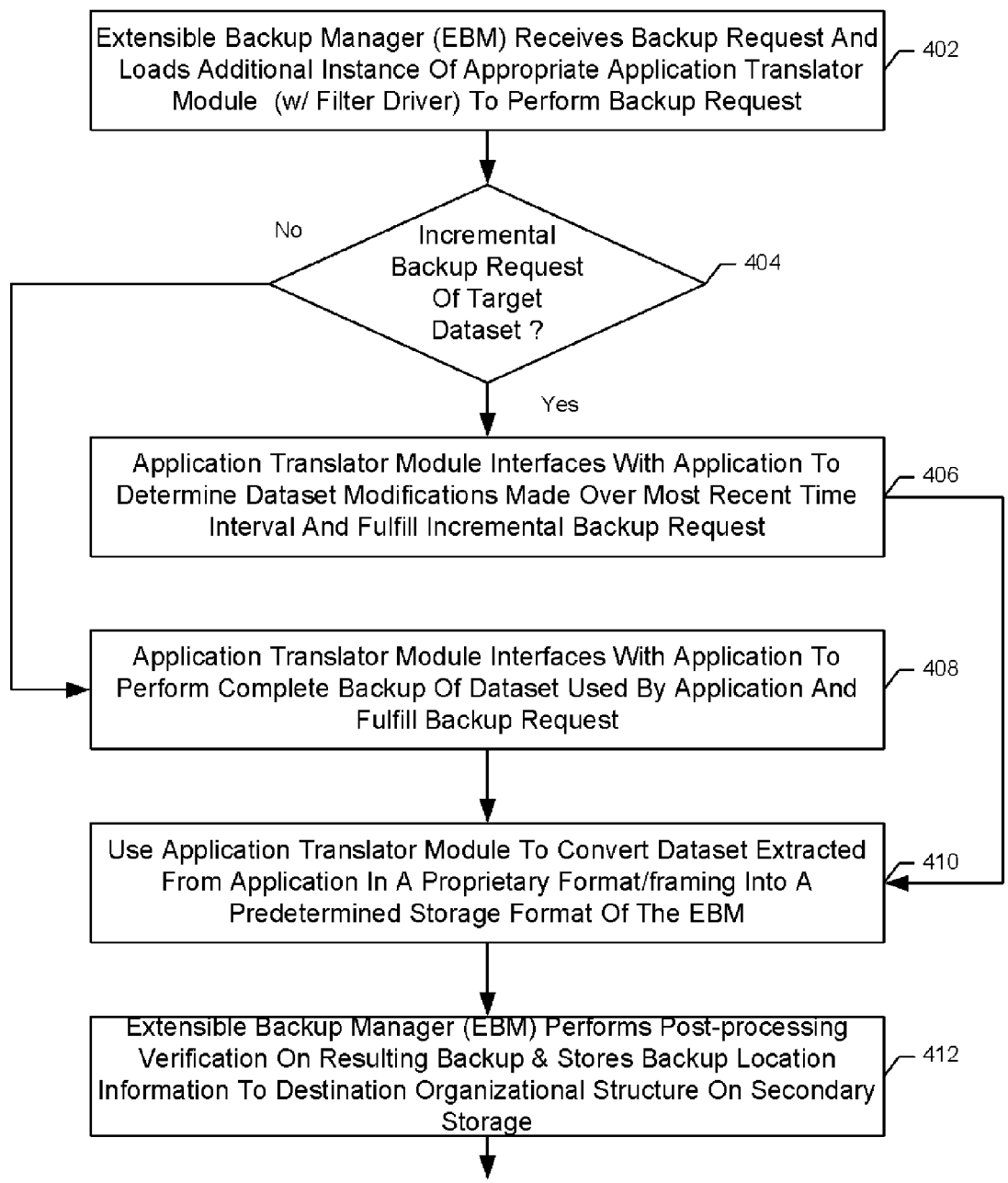
FIG. 4 is a block diagram illustrating some of the details associated with the process of backing up a dataset in accordance with backup operations in accordance with one implementation of the present invention.

FIG. 4 is a block diagram illustrating some of the details associated with the process of backing up a dataset in accordance with backup operations 312/316. However, one skilled in the art can see that FIG. 4 can also be used as guidance for details of a restoration operation as the EBM would selectively invoke a similar or the same application translator module to perform a conversion between a predetermined storage format and the proprietary application format in an analogous manner but different order.

In this example, the EBM receives the backup request and proceeds to load a first or additional instance of appropriate application translator module (w/filter driver) to perform backup request (402). For example, a backup filter driver may be used to identify specific blocks or files modified according to a certain criteria and then suggest backing them up to the EBM through the application translator module.

Next, aspects of the present invention determines if a backup request is made for incremental or complete backup of the target dataset (404). This determination may be performed by the EBM directly or at a higher level determination in the backup controller or other component in the archive component organization of the present invention. In response to the determination, aspects of the present invention may then load the appropriate application translator module to interface with the application, determine dataset modifications made over most recent time interval and fulfill the incremental backup request. (406) For example, the application translator module may interface with an application and obtain several data files but may filter through and only store those blocks that have been recently modified in order to minimize storage and bandwidth requirements for performing the backup operations. Alternatively, application translator module interfaces with the application to perform complete backup of dataset used by the application and fulfill the backup request. (408) The complete backup may include a set of files, a filesystem, a database or even streaming data from a video or audio application.

In either of the above incremental or complete backup scenarios, aspects of the present invention then uses application translator module to convert the dataset extracted from the application in a proprietary format/framing into a predetermined storage format of the EBM. (410). A previously described, this may include converting from a streaming dataset used by an application into a set of blocks as the format used by the EBM dictates. Once the data is obtained and converted, the EBM may perform various post-processing verifications on the resulting backup and proceed to store backup location information to destination organizational structure on secondary storage, (412) For example, an EBM may create a directory on the secondary storage for the target dataset to eventually be stored and then also include some metadata in this area of the secondary storage in order to organize the backed up datasets being moved from primary storage. Metadata information may include date the data was created as well as information describing certain formatting and other boundary information associated with the backed up data.

Figure 5:
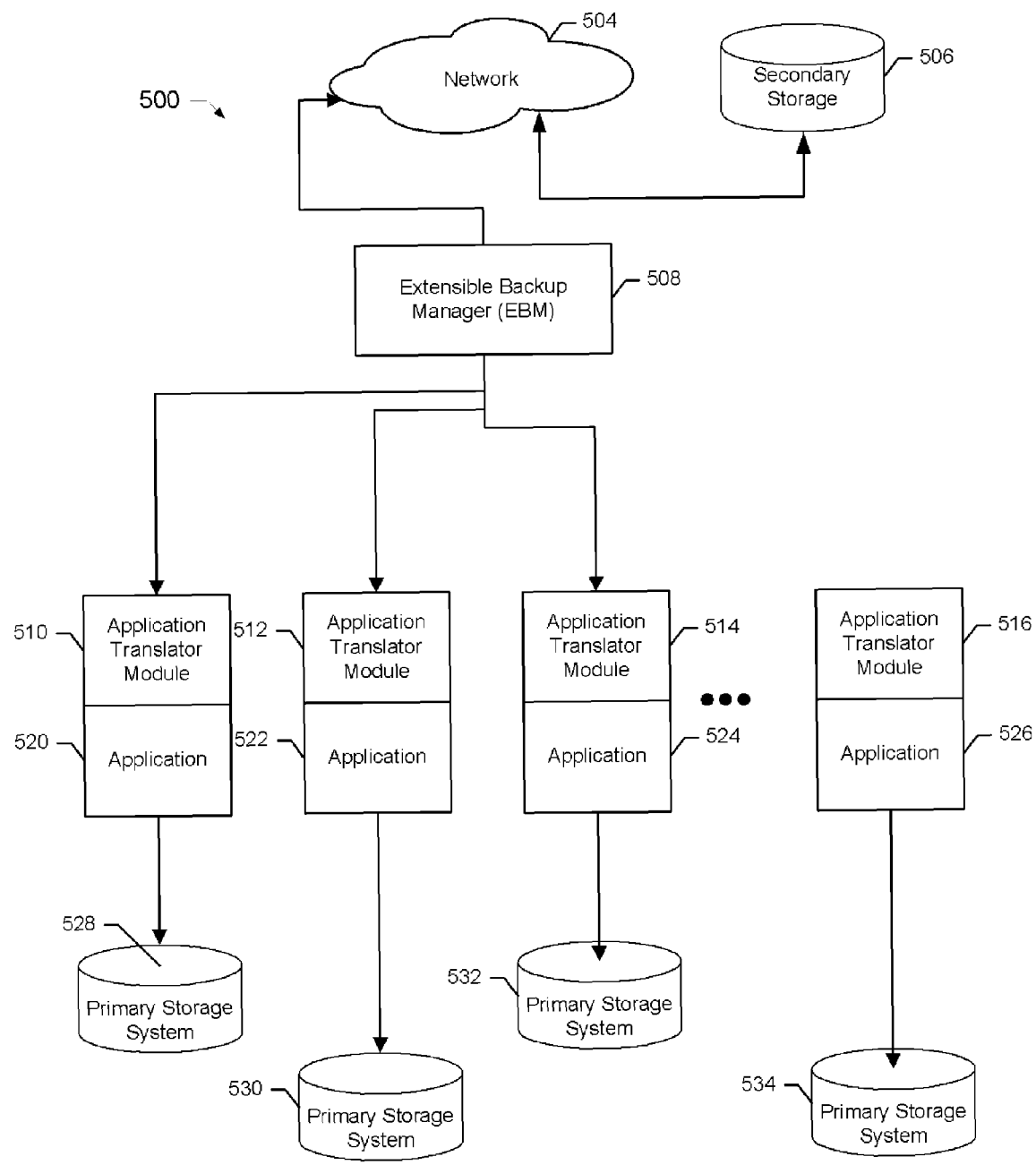
FIG. 5 illustrates a schematic illustration of an archive system designed in accordance with aspects of the present invention to clarify more salient aspects of the invention.

FIG. 5 illustrates a schematic of an archive system designed in accordance with aspects of the present invention and omits certain details to clarify more salient features of the invention. The system 500 in FIG. 5 illustrates one configuration useful when backing up several primary storage systems to a secondary storage 506 and central EBM 508 over a network 504. It can be seen that each application 520, application 522, application 524 and application 526 each have a corresponding application translator module 510, 512, 514 and 516. Application translator modules are not only interfacing with applications 520, 522, 524 and 526 but also primary storage 528, primary storage 530, primary storage 532 and primary storage 534. In operation, the application translator modules illustrated in FIG. 4 are responsible for ensuring the data extracted is converted into the predetermined storage format of the EBM and then sent to EBM 508 for further processing before it is shipped over network 504 to secondary storage 506. For example, EBM 508 may determine checksum values and other information and store the result in a preliminary storage area on secondary storage 506 just in case cross reference is required for the backed up data. For example, EBM 508 may calculate certain checksum values and other measures to determine if secondary storage has been tampered with or is having other data corruption issues.

Figure 6:
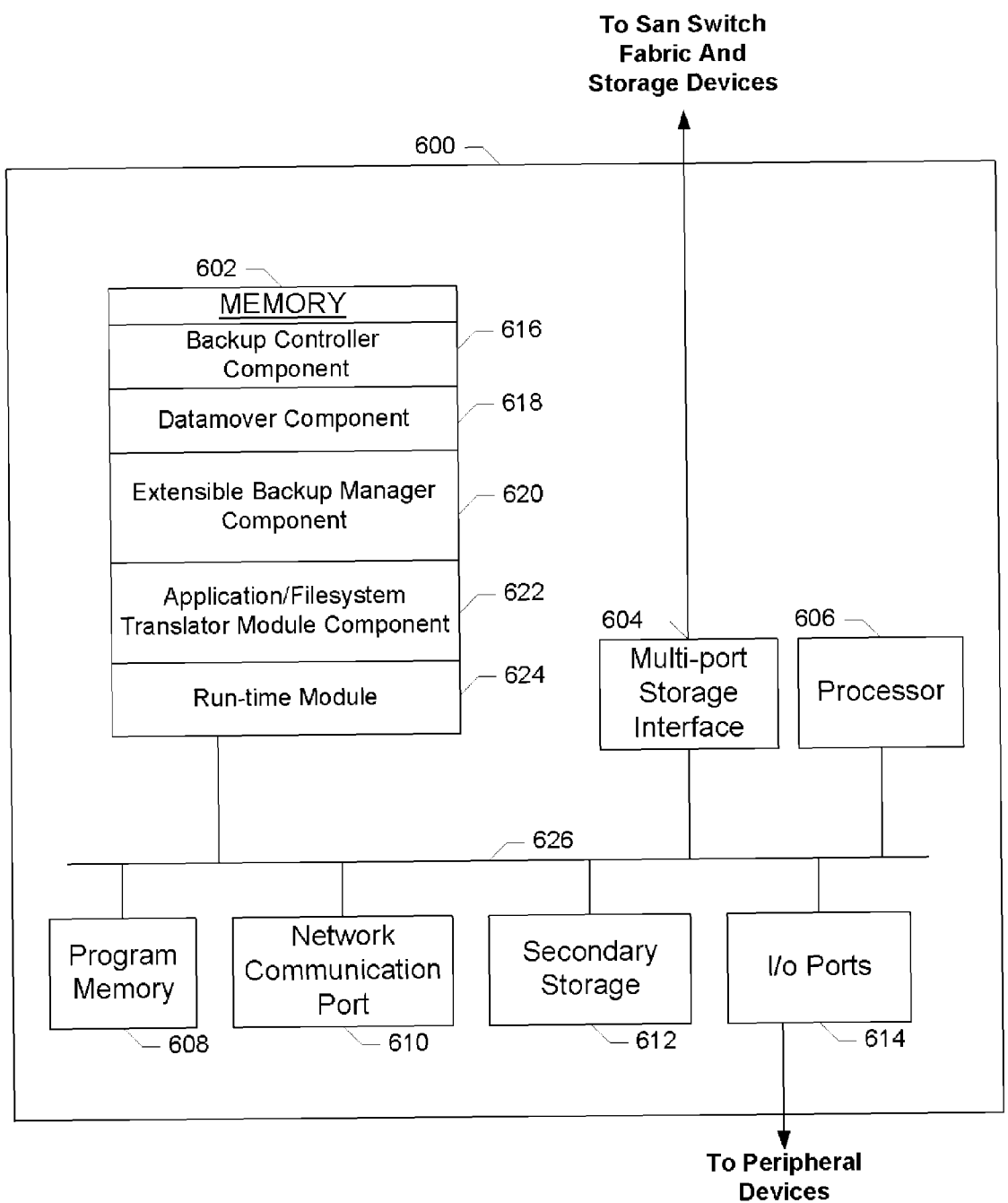
FIG. 6 is a block diagram of a system designed in accordance with one aspect of the present invention.

Referring to FIG. 6, system 600 includes a memory 602 to hold executing programs (typically random access memory (RAM) or read-only memory (ROM) such as a flash ROM), a multi-port storage interface 604 for connecting storage devices, a processor 606, program memory 608, network communication port 610, secondary storage 612 and I/O ports 614 for connecting to peripheral devices all operatively coupled together over an interconnect 626. System 600 can be preprogrammed, in ROM, for example, using field-programmable gate array (FPGA) technology or it can be programmed (and reprogrammed) by loading a program from another source (for example, from a floppy disk, a CD-ROM, or another computer). Also, system 600 can be implemented using customized application specific integrated circuits (ASICs).

In various implementations of the present invention, memory 602 holds a backup controller component 616, data-mover component 618, extensible backup manager component 620, application filesystem translator module component 622 and a run-time component 624 for managing one or more of the above and other resources.

In general, implementations of the invention can be implemented in digital electronic circuitry, or in computer hardware, firmware, software, or in various combinations thereof. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, the processor receives instructions and data from a read only memory and/or a random access memory. Also, a computer will include one or more secondary storage or mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs (application specific integrated circuits).

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Unless otherwise specified, steps of a method claim need not be performed in the order specified. The invention is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. An archive method using a primary storage and a secondary storage comprising:
   receiving a backup request for a target dataset used by an application on a primary storage system to be backed up on a secondary storage system, wherein the primary storage system may have one or more different applications and each application having a corresponding one or more different proprietary application formats for storing their datasets;
   identifying an application translator module component to be loaded into an extensible backup manager that converts between a proprietary application format associated with the target dataset and a predetermined storage format used by the extensible backup manager;
   scheduling a baseline backup of entire target dataset from the primary storage to the secondary storage using the application translator module to convert from the proprietary application format into the predetermined storage format when the baseline backup of the target dataset has not yet been performed;
   performing an incremental backup of the target dataset in addition to the baseline backup of the entire target dataset, if the incremental backup is scheduled, wherein the incremental backup uses the application translator module to convert from the proprietary application format associated with the application into the predetermined storage format of the extensible backup manager; and
   invoking a data mover component from the extensible backup manager when the application translator module has completed converting from the proprietary application format into the predetermined storage format wherein the data mover component causes the incremental backup and the baseline backup of the entire target dataset, if scheduled, to be moved from the primary storage to the secondary storage as requested and stored in the predetermined storage format rather than the proprietary application format associated with the application.

2. The method of claim 1 wherein the application is selected from a set of applications including an application server delivering application data to a thin client, a web application server delivering web application data to a web application thin client, an on-demand application server delivering on-demand application data to a on-demand application thin client.

3. The method of claim 1 wherein the application may be a filesystem and the target dataset includes data associated with the filesystem.

4. The method of claim 2 wherein the thin client is remotely located from the extensible backup manager over a network.

5. The method of claim 1 further comprising:
   generating an additional application translator module for each backup request that operates to separately convert between a proprietary application format and a predetermined storage format; and identifying, by a single extensible backup manager, each additional application translator module in accordance with the target dataset and application and ensuring, by the single extensible backup manager, each application translator module completes conversion of the target dataset from the proprietary application format into the predetermined storage format.

6. The method of claim 1 wherein performing the incremental backup and the baseline backup further comprises;

interfacing the application translator module with each application to obtain the target dataset; and providing backup location information associated with the resulting target dataset to the extensible backup manager once the backup request has been fulfilled.

7. The method of claim 1 further comprising:

performing post-processing verification on the target dataset once the backup request has been fulfilled using the extensible backup manager; and storing backup location information using the extensible backup manager wherein the backup location information of the resulting target dataset on the primary storage is stored on a destination organizational structure on the secondary storage.

8. The method of claim 1 wherein the incremental backup includes all files modified since the most recent baseline backup of the entire target dataset.

9. The method of claim 1 wherein the incremental backup includes all blocks of data modified since the most recent baseline backup of the entire target dataset.

10. The method of claim 1 wherein the application translator module further performs a snapshot backup for the dataset at a particular time to provide an application consistent view of the dataset as preparation for subsequent backup events.

11. An archive method using a primary storage and a secondary storage comprising:

receiving a restore request for a target dataset archived on a secondary storage system and associated with an application on a primary storage system, wherein the primary storage system may have one or more different applications and each application having a corresponding one or more different proprietary application formats for storing their datasets;

identifying an application translator module to be loaded into an extensible backup manager that converts between a predetermined storage format used by the extensible backup manager and a proprietary application format associated with the target dataset;

converting the target dataset archived in a predetermined storage format back into the proprietary application storage format associated with the application using the application translator module; and invoking a data mover component from the extensible backup manager when the application translator module has completed converting from the predetermined storage format into the proprietary application format wherein the data mover component causes incremental restore and baseline restore of the entire target dataset, if baseline restore is requested, to be moved from the secondary storage system to the primary storage system as requested in the restore request and to be stored on the primary storage system in the proprietary application format associated with the application instead of the predetermined storage format associated with the extensible backup manager.

12. The method of claim 11 wherein the application is selected from a set of applications including an application server delivering application data to a thin client, a web application server delivering web application data to a web application thin client, an on-demand application server delivering on-demand application data to a on-demand application thin client.

13. The method of claim 11 wherein the application may be a filesystem and the target dataset includes data associated with the filesystem.

14. The method of claim 12 wherein the thin client is remotely located from the extensible backup manager over a network.

15. The method of claim 1 further comprising:

generating an additional application translator module for each restore request that operates to separately convert between a predetermined storage format and a proprietary application format; and identifying, by a single extensible backup manager, each additional application translator module in accordance with the target dataset and application and ensuring, by the single extensible backup manager, each application translator module completes conversion of the target dataset from the predetermined storage format into the proprietary application format.

16. The method of claim 1 further comprising:

performing post-processing verification on the target dataset once the restore request has been fulfilled using the extensible backup manager; and storing restore location information using the extensible backup manager wherein the restore location information of the resulting target dataset on the primary storage may be stored on a destination organizational structure on the secondary storage.

17. A computer program product, tangibly stored on a computer-readable medium, for archiving using a primary storage and a secondary storage comprising instructions operable to cause a programmable processor to:

receive a backup request for a target dataset used by an application on a primary storage system to be backed up on a secondary storage system, wherein the primary storage system may have one or more different applications and each application having a corresponding one or more different proprietary application formats for storing their datasets;

identify an application translator module component to be loaded into an extensible backup manager that converts between a proprietary application format associated with the target dataset and a predetermined storage format used by the extensible backup manager;

schedule a baseline backup of entire target dataset from the primary storage to the secondary storage using the application translator module to convert from the proprietary application format into the predetermined storage format when the baseline backup of the target dataset has not yet been performed;

perform an incremental backup of the target dataset in addition to the baseline backup of the entire target dataset, if the incremental backup is scheduled, wherein the incremental backup uses the application translator module to convert from the proprietary application format associated with the application into the predetermined storage format of the extensible backup manager; and invoke a data mover component from the extensible backup manager when the application translator module has completed converting from the proprietary application format into the predetermined storage format wherein the data mover component causes the incremental backup and the baseline backup of the entire target dataset, if scheduled, to be moved from the primary storage to the secondary storage as requested and stored in the predetermined storage format rather than the proprietary application format associated with the application.

18. A computer program product, tangibly stored on a computer-readable medium, for archiving using a primary storage and a secondary storage comprising instructions operable to cause a programmable processor to:

receive a restore request for a target dataset archived on a secondary storage system and associated with an application on a primary storage system, wherein the primary storage system may have one or more different applications and each application having a corresponding one or more different proprietary application formats for storing their datasets;

identify an application translator module to be loaded into an extensible backup manager that converts between a predetermined storage format used by the extensible backup manager and a proprietary application format associated with the target dataset;

convert the target dataset archived in a predetermined storage format back into the proprietary application storage format associated with the application using the application translator module; and invoke a data mover component from the extensible backup manager when the application translator module has completed converting from the predetermined storage format into the proprietary application format wherein the data mover component causes incremental restore and baseline restore of the entire target dataset, if the baseline restore is requested, to be moved from the secondary storage to the primary storage as requested in the restore request and to be stored on the primary storage in the proprietary application format associated with the application instead of the predetermined storage format associated with the extensible backup manager.

* * * * *